Nov. 30, 1937. P. RHEINLANDER 2,100,978
APPARATUS FOR MEASURING AND DELIVERING GAS
QUANTITIES REDUCED TO A NORMAL CONDITION
Filed Aug. 2, 1933  3 Sheets-Sheet 1
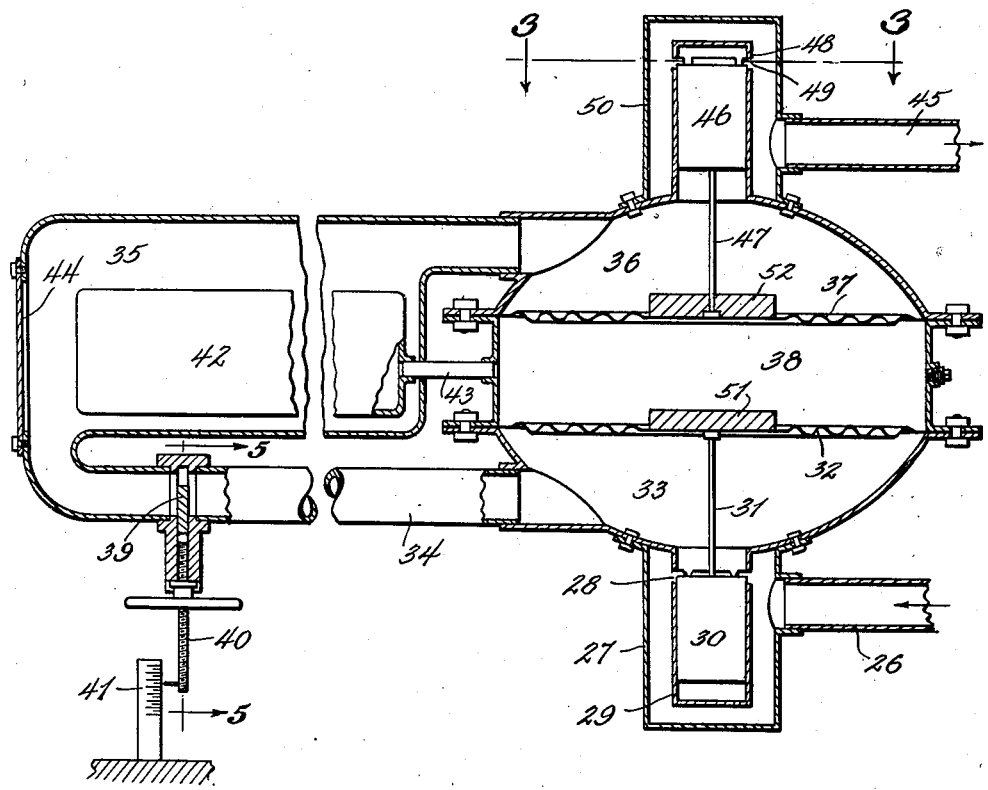
Fig. 1.
Fig. 2.
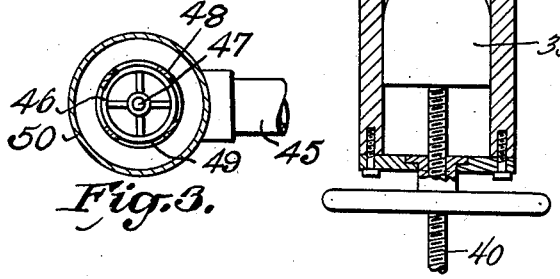
Fig. 3.
INVENTOR.
Paul Rheinlander
BY
A. D. Adams
ATTORNEY.

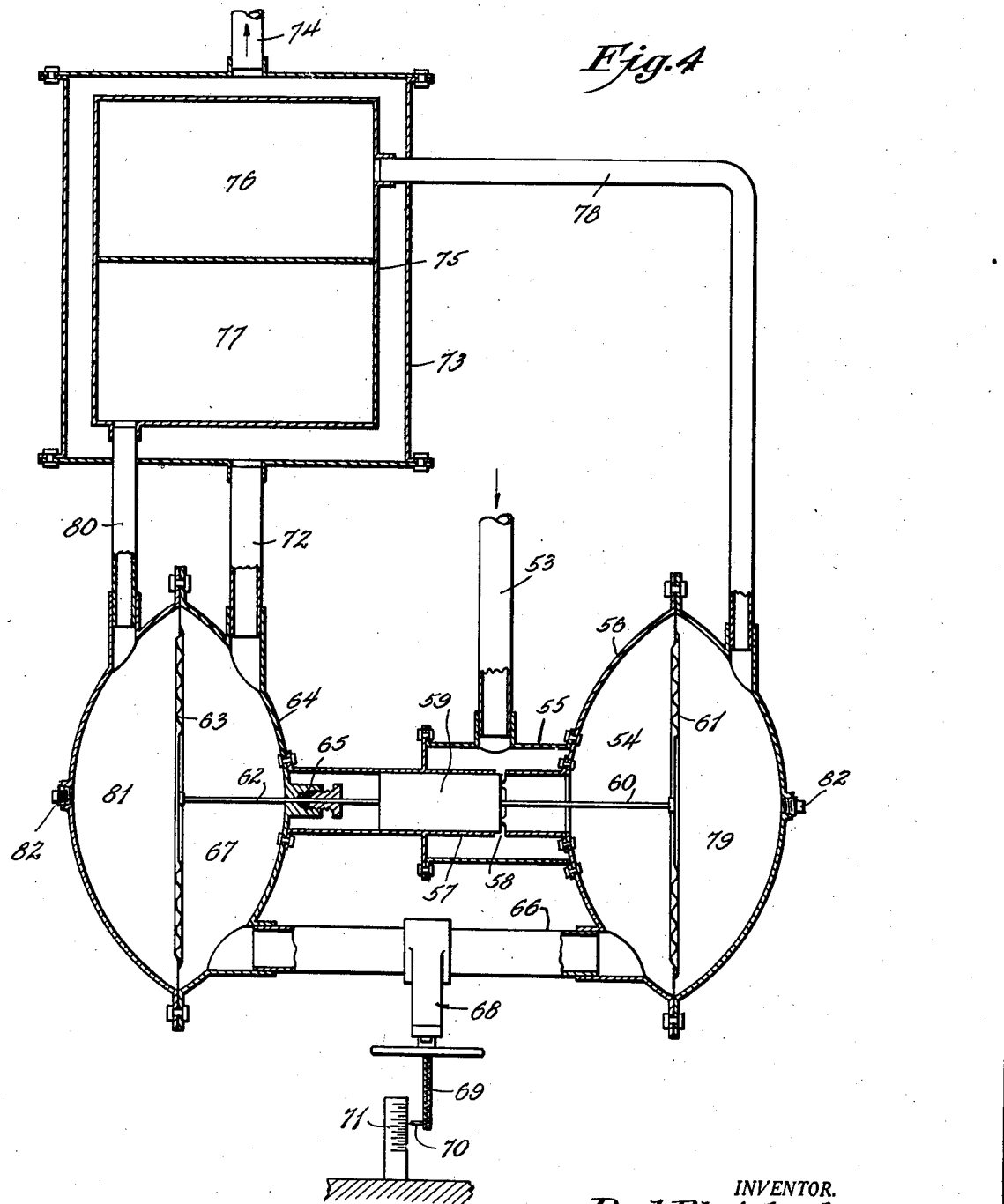

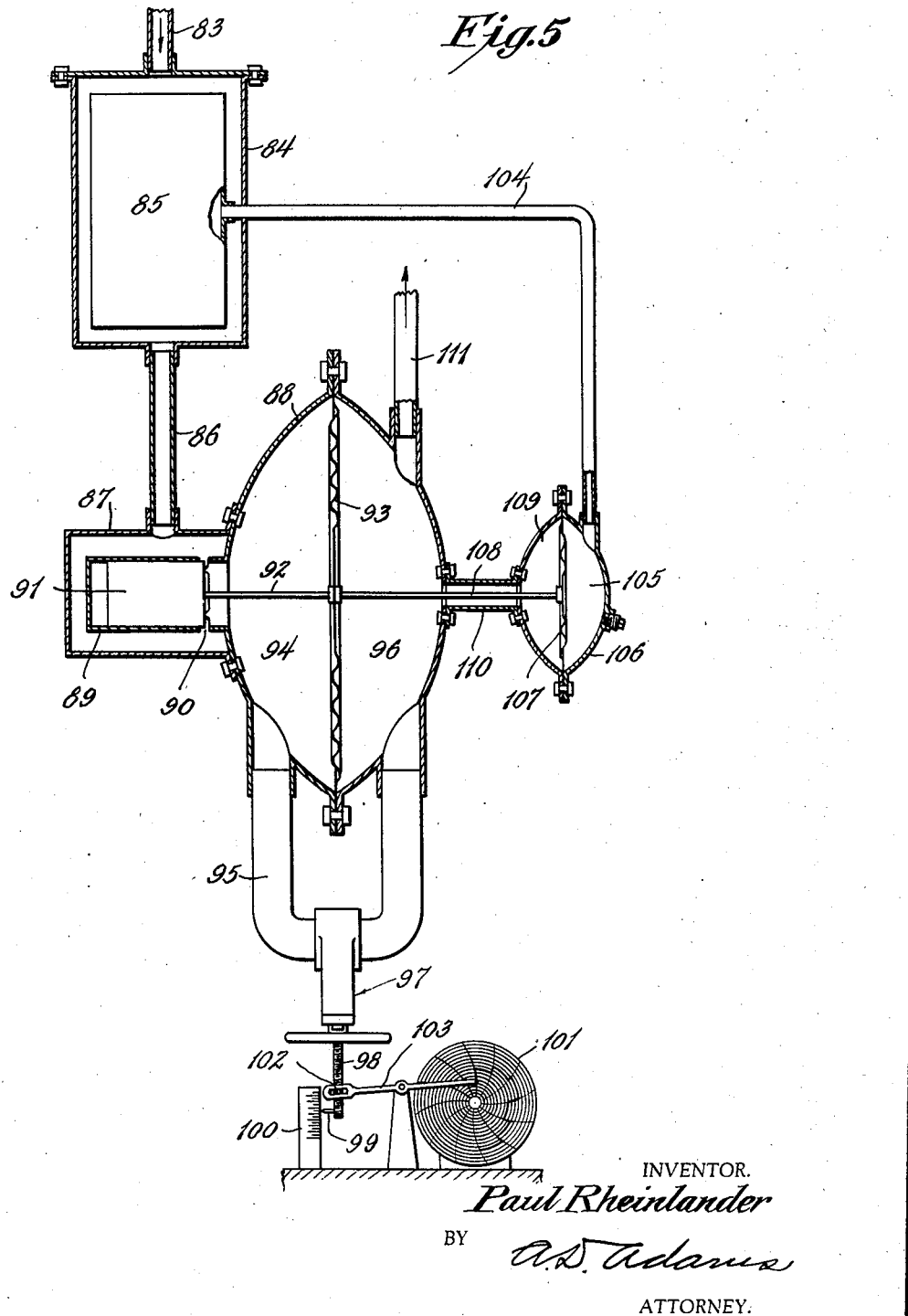

Patented Nov. 30, 1937

2,100,978

UNITED STATES PATENT OFFICE 2,100,978

APPARATUS FOR MEASURING AND DELIVERING GAS QUANTITIES REDUCED TO A NORMAL CONDITION

Paul Rheinländer, Hagen, in Westphalia, Germany, assignor to Askania-Werke A. G. vormals Central Werkstatt Dessau und Earl Bamberg-Friedenau, a German company Application August 2, 1933, Serial No. 683,308
In Germany August 5, 1932

15 Claims. (Cl. 73—199)

This invention relates to apparatus for measuring and regulating the flow of gas in terms of standard conditions.

In measuring quantities of gas by the volumetric method or the flow measuring method, it is necessary to correct the measurements obtained in respect to pressure, temperature and humidity, if comparable reference magnitudes are to be obtained. Suitable reference magnitudes are standard cubic feet, dry at 0° centigrade and at a pressure of 760 mm. (mercury column) or normal atmospheric pressure. Such corrections of measurements obtained are made by calculating, from the pressure, temperature and humidity content of the gas at the time of making the measurement, the quantity in cubic feet which it would be in dry condition at a pressure of 760 mm. (mercury column) and at a temperature of 0° centigrade.

The conversion of the quantity of gas delivered in standard cubic feet is of special importance in the case of the delivery of large quantities of gas, for example in supplying gas at a distance. Heretofore, the quantities of gas were measured either volumetrically, by means of ordinary positive displacement gas meters or by the drop in pressure created by an obstruction in the line, and the number of standard cubic feet was then determined by calculation.

One of the objects of the present invention is to provide apparatus for measuring and regulating the delivery of quantities of gas in which all calculations are eliminated and all measurements can be read directly in standard volumetric units.

Another object of the invention is to provide such apparatus whereby it is possible to insure the delivery of a predetermined quantity of gas in terms of standard conditions.

Another object of the invention is to provide such apparatus wherein the ratio of the absolute temperature and the absolute pressure of the gas as the latter passes a meter, is maintained constant.

Another object of the invention is to provide such apparatus wherein the gas in passing through a suitable measuring apparatus is maintained by automatic pressure-regulating or governing means at a pressure which is always proportional to the absolute temperature of the gas to be measured.

The invention and its aims and objects will be readily understood from the following description of various apparatus embodying the features of my invention and herein shown for illustrative purposes, the true scope of the invention being more particularly pointed out in the appended claims.

In the drawings:

Fig. 1 is a sectional view of a form of gas measuring and regulating apparatus;

Fig. 2 is a sectional view taken on the line 5—5 of Fig. 1;

Fig. 3 is a sectional view taken on the line 3—3 of Fig. 1;

Fig. 4 is a sectional view of another modified form of measuring and regulating apparatus adapted for use when the pressure of the gas delivered to the apparatus is maintained approximately constant; and Fig. 5 is a sectional view of still another modified form of the apparatus for measuring and governing the flow through an orifice or restriction.

As one illustrative means of carrying out my invention, I may use a variable throttling resistance such as a valve in the gas current which is so controlled or governed by the temperature and the pressure of the gas, that the ratio between the absolute pressure and the absolute temperature is maintained constant.

My novel apparatus may be used for measuring the flow of gas by regulating the gas current or flow in front of a constriction or other suitable throttling device in the gas conduit. An indicating device connected to the constriction may be graduated in standard units such as cubic feet, if the specific gravity of the gas does not vary. If, by means of a further regulator, the difference in pressure at said throttling device or constriction, be kept constant, the quantity of gas in standard cubic feet or units flowing through said constriction, will always remain constant. If now said constriction be controlled by a valve or an adjustable slide, the quantity of gas flowing therethrough will be determined by the product of the free area of the valve opening and the flow coefficient; that is to say, the position of the valve stem of a slide valve may indicate directly the quantity in standard cubic feet. Such a measuring and regulating slide or valve greatly simplifies the work of the operator of furnaces, because in many industrial applications, it is necessary to keep constant the proportion of gas to air and maintain a more or less constant mixture ratio. Since the valve or slide also operates as a rate of flow meter, it could replace many expensive measuring devices.

The great advantages to be secured by the use of my novel apparatus embodying the features described, in conjunction with a measuring and regulating valve or slide, will be clearly apparent from the fact, alone, that it avoids the necessity to employ large bell or float-type flow meters or complex recorders which are inaccurate and the measurements obtained are of only questionable value. The usual practice is to use delicate instruments in accordance with which the rate of flow is adjusted by means of a valve. In accordance with this invention, the valve itself, which usually is of rugged construction, indictates by its position the total volume per time unit, going through the valve. In other words, the operator has only to operate the valve; while in the ordinary method of operation he has to watch the gauge, and in accordance with the indication he will adjust the valve.

One form of this invention embodying such a regulating slide valve which permits a predetermined volume of gas to pass is illustrated in Fig. 1. In this example, the gas enters through a pipe 26 and passes into a cylindrical housing 27, valve ports 28 in a cylindrical valve casing 29 controlled by the sleeve valve 30 which is connected by a stem 31 to a diaphragm 32. Thence, the gas passes into the lower chamber 33 of a compound diaphragm casing here shown as being made in three sections. From the chamber 33, the gas passes through a conduit 34 having an enlargement 35 into the upper chamber 36 of the diaphragm casing and its outlet pressure is controlled by a second diaphragm 37 in the diaphragm casing spaced from the lower diaphragm 32 and providing a central chamber 38 between the diaphragms. In this example, there is shown a constriction in the pipe 34 controlled by a gate or slide valve 39 carried by a suitable fitting. The valve is shown as having a screw-threaded stem 40 adapted to be operated by an ordinary hand wheel and the lower end of the stem carries a pointer cooperating with a stationary graduated scale 41 which may be calibrated to indicate the volume of gas passing through the constriction.

Within the enlargement 35 of the conduit 34 there is shown a closed container or gas chamber 42, which is charged with gas under the selected standard conditions of pressure, temperature and humidity. This container is connected by a conduit 43 with the central chamber 38 between the two diaphragms 32 and 37 so that both diaphragms are subjected to the pressure which is influenced by the temperature of the gas in the space or enlargement 35. The container may be inserted in the enlargement through an opening in the end of the chamber which is closed by a cover plate 44. From the upper chamber 36 the gas is delivered to an outlet pipe 45 through a valve 46 connected to the upper diaphragm 37 by a stem 47, the valve being arranged in a cylindrical casing 48 having ports 49 which discharge into a cylindrical housing 50. The construction of this outlet valve is preferably identical with that of the inlet valve excepting the location of the ports and is shown in section in Fig. 3. The stem of each valve is connected to a spider within the cylindrical valve member.

The diaphragms 32 and 37 are each shown as being weighted with weights 51 and 52 respectively. Now the pressure in the diaphragm chamber 33 will be equal to the pressure in the central chamber 38 plus a pressure balancing the force exerted by the weight 51. The pressure in the diaphragm chamber 36 will be equal to the pressure within the chamber 38 less a pressure balancing the force exerted by the weight 52. The ratio between pressure and temperature will therefore be kept constant in both cases. Furthermore, the drop in pressure between the chambers 33 and 36 will be kept constant by the two weights 51 and 52. The gas therefore flows through the constriction formed by the valve slide 39 in a condition corresponding to the normal condition and with a constant drop in pressure. The quantity of gas flowing through the constriction will therefore be proportional to the volume in terms of standard conditions and, assuming the flow coefficient to be constant it will be proportional to the free area of the constriction. Thus, it is possible to replace the ordinary gas meter with an adjustable slide valve which correctly indicates the volume in standard cubic feet or other units and accurately to regulate the flow. This is extremely important in many industrial applications.

If the absolute pressure of the gas is reasonably constant, volume or quantity measurements may be obtained in many instances by keeping the expression $$\frac{p1-p2}{T}$$

constant. In this expression $p1$ is the pressure in front of a constriction and $p2$ the pressure on the opposite side of a constriction and $T$ the absolute temperature.

Another form of the invention embodying such a measurement mechanism is shown in Fig. 4. In this example, the gas is delivered from a pipe line, tank or other source of gas at substantially constant pressure through a pipe or conduit 53 to a diaphragm chamber 54, the pipe 53 being connected to a cylindrical housing 55 suitably secured to the diaphragm casing 56 and surrounding a cylindrical valve casing 57 having ports 58 controlled by a sleeve valve 59. The sleeve valve is connected at one end by a stem 60 to a diaphragm 61 in the diaphragm casing 56 and, at the other end, by a stem 62 to a diaphragm 63 in another diaphragm casing 64. The stem 62 extends through an ordinary stuffing box 65 in the diaphragm casing 64 and the cylindrical valve casing 57 is shown as being also secured to the diaphragm casing 64 around the stuffing box.

From the diaphragm chamber 54 the gas passes through a conduit 66 into chamber 67 of the diaphragm casing 64 and the conduit 66 has an adjustable slide valve 68 to control a constriction in said conduit 66 in the same manner as explained in the description of Fig. 1, the valve stem 69 having a pointer 70 cooperating with a stationary graduated scale 71. From the chamber 67 the gas passes through a conduit 72 into a tank or enlargement 73 leading to the outlet pipe or conduit 74. Within the tank 73 there is shown a gas container having separate compartments 76 and 77 to receive charges of gas under the desired standard conditions of pressure, temperature and humidity, the compartment or container 76 being connected by a pipe 78 to a chamber 79 in the diaphragm casing 56 and the chamber 77 being connected by a conduit 80 to a chamber 81 in the diaphragm casing 64. Incidentally, each of the diaphragm casings is shown as having a screw plug 82 closing filling openings through which water or moisture may be introduced into the charges of controlling gas to saturate it according to the saturation of the gas being measured or controlled and enable the correct dry volume of the flowing gas in standard units to be determined. The arrangement is such that the pressures in the two containers 76 and 77 will control the action of the diaphragms 61 and 63 to exert the regulating effect on the valve 59. For example, the pressure in the compartment 77 may be adjusted so that it is equivalent to 740 mm. of mercury at 0° C. and the pressure in the container 76 may be adjusted so that it is equivalent to 760 mm. of mercury at the same temperature. Hence, the same pressure differential will exist between the diaphragm chambers 54 and 67 and at the constriction produced by the valve 68 in the connecting pipe 66. If the temperature of the gas varies, the pressure differential will vary in the same proportion. The slide valve regulates the supply of the gas so that the drop in pressure at the constriction will be equal to the pressure differential between the two containers. The graduated scale 71 may be graduated in standard cubic feet and the readings will be accurate if the absolute pressure of the gas in the supply main is maintained constant. The control will maintain the differential across the valve constant, regardless of the inlet pressure, but the specific gravity of the gas, and therefore, its total weight, depends also on the absolute pressure of the gas. For the same differential pressure at various static pressures, different amounts of flow will be obtained.

Another embodiment of the invention is based on a modification of the equation representing gas flow through a constriction. Considering the equation of flow through an orifice, we have $$Q = c_1 \sqrt{xy}$$

giving the flow in standard cubic feet, or rather the rate of flow in weight units per time unit. In this equation, $c_1$ is a constant which depends on the size and shape of the orifice and the nature of the gas; $x$ is the pressure drop across the constriction and $y$ is the specific weight of the gas. As $y$ is proportional to $$\frac{P \text{ (absolute pressure)}}{T \text{ (absolute temperature)}}$$

we would obtain a constant flow in standard units if we make $x$ proportional to $$\frac{T}{P}$$

In this case the root value $$\sqrt{xy}$$

would be a constant at any pressure and at any temperature. By calculation, it has been found however that within practical ranges it is sufficient to make the pressure drop $x = c_2(T-P)$ instead of the more exact expression $$x = c_3 \frac{T}{P}$$

wherein $c_2$ and $c_3$ are constants and $P$ is the absolute pressure. The following table gives the volumetric errors in per cent for different temperatures and pressures:

| Absolute temperatures | 273 | 303 | 273 | 303° C. |
|---|---|---|---|---|
| Absolute pressures (mm. mercury) | 760 | 760 | 720 | 720 |
| Volumetric errors % | 0.0 | +1.8 | −1.5 | 0.0 |

The above table proves that a device which controls the differential pressure across a constriction proportionally to the difference between a pressure which is proportional to the absolute temperature and the absolute pressure of the gas will be satisfactory for controlling and indicating or recording gas flow in standard units within the ranges 760 mm. to 720 mm. of mercury and 273° to 303° C. absolute temperatures. Such a device is shown in Fig. 5.

Referring to Fig. 5, the gas enters through a pipe or conduit 83 into a tank or enlargement 84 in which is located the gas container or chamber 85 for the controlling gas. From the tank 84 the gas passes through a pipe 86 into a cylindrical housing 87 secured to the diaphragm casing 88 and enclosing the cylindrical valve casing 89 having valve ports 90 controlled by the sleeve valve 91. The sleeve valve 91 is connected by a stem 92 to a diaphragm 93 in the diaphragm casing.

The gas enters diaphragm chamber 94 and passes through a conduit 95 into diaphragm chamber 96. A throttling slide valve 97 is arranged in the conduit 95 and likewise has a stem 98 carrying a pointer 99 cooperating with the stationary graduated scale 100. Also connected to the valve stem 98 is shown a recorder 101, the stem having an ordinary pin 102 operating a slotted pivoted lever 103 which carries the recording pen. The arrangement is such that the volume of gas passing through the constriction can be read on the scale and the total volume recorded by means of the recording mechanism.

The gas pressure in both of the diaphragm chambers 94 and 96 is governed by the pressure in the gas container 85 which preferably has been adjusted under standard conditions of pressure, temperature and humidity. For this purpose the container 85 is connected by a conduit 104 to a diaphragm chamber 105 in a small diaphragm casing 106 which has a diaphragm 107 connected by a stem or rod 108 to the diaphragm 93. In this instance, the other chamber 109 in the diaphragm casing 106 is connected by a short conduit 110 around the rod 108 to communicate with the diaphragm chamber 96 in the diaphragm casing 88. The pressure in the diaphragm chamber 94 will be so controlled or governed that the drop in pressure at the throttle constriction will be proportional to the difference in pressure in the two diaphragm chambers 105 and 109. Furthermore, the gas leaving the diaphragm chamber 96 through the outlet pipe 111 is controlled by the diaphragms and its volume is kept constant because the quantity of gas flowing through the constriction is constant. The adjustable slide makes it possible to measure simultaneously a constant quantity of gas and the reference magnitude can be, and preferably is, dry standard cubic feet or other units. In this case, the absolute pressure of the gas can fluctuate freely between the limitations of, say, 720 mm. of mercury and 760 mm. of mercury and the temperature range may be between 273° and 303° C.

By using such controlling and measuring apparatus, the volume of gas can be indicated, recorded or transmitted by any suitable means for remote indicating or recording. Moreover, the position of the slide will indicate the volume passing through the throttling valve or constriction. This type of measuring device is very superior to the old and well known flow measuring devices in that it measures directly the volume in terms of standard conditions and no complicated calculations are necessary. It may be continuously adjusted by hand at furnaces, for example, or at separate points in accordance with the requirements of each furnace. Also, it can be used at central gas measuring stations as a substitute for the usual large gas meter. Apart from the fact that normal volumetric units or cubic feet are directly registered or indicated by such mechanism, the latter excels all known devices of this type by the simplicity of its construction, operation and manipulation.

It will be apparent to those skilled in the art that my novel apparatus can be used wherever it is desired to measure or deliver predetermined gas quantities reduced to any normal state or condition of the gas.

I am aware that the invention may be embodied in other specific forms without departing from the spirit or essential attributes thereof, and I therefore desire the construction described in the foregoing description to be considered in all respects as illustrative and not restrictive, reference being had to the appended claims rather than to the foregoing description to indicate the scope of the invention.

I claim:

1. Apparatus of the class described for delivering constant gas quantities reduced to a normal condition, comprising in combination, a passage for the gas to be delivered; a constriction in said passage; and two regulating means one of which maintains the pressure of the gas upstream of said constriction proportionally equal to the absolute temperature of said gas upstream of said constriction, the other of said regulating means being connected to maintain the difference in pressures of the gas on opposite sides of said constriction substantially constant.

2. Apparatus of the class described comprising a passage for the gas to be measured; an adjustable slide valve in said passage, said valve being provided with a scale calibrated in terms of normal volumetric units; and pressure operated regulating means for regulating the pressure on opposite sides of said valve in accordance with the temperature and pressure of the gas to be measured.

3. Apparatus of the class described comprising, in combination, a conduit for the gas; two pressure differential regulators comprising two chambers, the chamber of each of the differential pressure regulators being connected by said conduit; an inlet and an outlet passage for the gas leading to and from said chambers and communicating with said conduit; one of said pressure regulators including means to control said inlet passage, the other of said pressure regulators including means to control said outlet passage; said pressure regulators including an intermediate chamber between said two first-named chambers; a container for a closed off volume of a controlling gas subjected to the same temperature as the gas in said conduit between said chambers; throttling means in said conduit between the first named chambers; and a passage leading from said container to said intermediate chamber.

4. Apparatus as set forth in claim 3, each of said regulators including a diaphragm, and said regulators including a casing within which said diaphragms are so arranged as to divide the casing into said two chambers and said intermediate chamber; said intermediate chamber being between the diaphragms and communicating with the container, so that the pressure of the controlling gas acts on both diaphragms.

5. Apparatus as set forth in claim 3, each of said regulators including a diaphragm, and said regulators including a casing within which said diaphragms are so arranged as to divide the casing into said two chambers and said intermediate chamber; said intermediate chamber being between the diaphragms and communicating with the container so that the pressure of the gas in said container acts on both diaphragms; and said diaphragms being loaded to maintain the pressure drop in said conduit.

6. Apparatus for controlling the flow of gas to obtain a constant weight flow of the gas comprising, in combination, a gas conduit; a constriction in said conduit; pressure regulating throttling means independent of said constriction and operable responsive to the pressures on the upstream and downstream side of said constriction and responsive to changes in absolute temperature for maintaining the differential pressure across said constriction constant while varying the absolute pressures of the gas upstream and downstream of the constriction proportional to changes in absolute temperature.

7. Apparatus for controlling the flow of gas to obtain a constant weight flow of gas comprising, in combination, a gas conduit; a constriction in said conduit; a pressure regulating valve in said conduit upstream of said constriction; means responsive to changes in pressure at the upstream side of said constriction and responsive to changes in absolute temperature of the gas connected to operate said pressure regulating valve; a second pressure regulating valve in said conduit downstream of said constriction; and means responsive to changes in pressure at the down-stream side of said constriction and responsive to changes in absolute temperature of the gas connected to operate said second pressure regulating valve.

8. Apparatus for controlling the flow of gas comprising, in combination, a source of gas at substantially constant pressure; a gas conduit; a constriction in said conduit; a pressure regulating valve in said conduit; two closed chambers filled with controlling gases of different pressure and subjected to the same temperature as that of the gas to be controlled; a first differential pressure responsive means connected to be acted upon by the pressure on the upstream side of said constriction and the pressure of the one controlling gas; a second differential pressure responsive means connected to be acted upon by the pressure on the downstream side of said constriction and the pressure of the other controlling gas; and an operative connection between said first and second differential pressure responsive means for acting in opposition to each other on said regulating valve.

9. Apparatus for controlling the flow of gas comprising, in combination, a source of gas at a substantially constant pressure; valve means to govern the flow of the gas; two spaced diaphragm casings; a diaphragm in each casing dividing it into separate chambers; means operatively connecting both diaphragms to said valve means; said source of gas being connected to one of the chambers in one of the diaphragm casings and the valve means being arranged to control the admission of said gas to said chamber; a conduit connecting the chamber into which the gas is admitted to one of the chambers in the second diaphragm casing; a constriction in said conduit; and means to exert controlling pressure in the remaining chambers of the diaphragm casings proportional to the absolute temperature of the gas, whereby the pressure differential across said constriction is maintained substantially proportional to the absolute temperature of the gas.

10. Apparatus as set forth in claim 9 wherein the means for exerting controlling pressure in the remaining chambers of the diaphragm casings proportional to the absolute temperature of the gas comprises separate closed chambers containing gas at different pressures subjected to the temperature of the gas being controlled.

11. Apparatus for controlling the flow of gas comprising, in combination, a gas conduit; a constriction in said conduit; a valve in the conduit; and means for governing the valve operable by opposed forces which are proportional, on the one hand, to the absolute temperature minus the absolute pressure of the gas and, on the other hand, to the pressures on opposite sides of the constriction, whereby to obtain a flow measurable approximately in terms of standard temperature and pressure conditions.

12. Apparatus for controlling the flow of gas comprising, in combination, a gas conduit; a constriction in said conduit; valve means in the conduit; means for operating said valve means; and means for creating controlling forces for said operating means which are proportional to the difference between a pressure which is proportional to the absolute temperature minus a pressure proportional to the absolute pressure of the gas and the pressure differential on opposite sides of the constriction.

13. Apparatus for controlling the flow of gas comprising, in combination, a gas conduit; a valve in said conduit; a pair of diaphragm casings; diaphragms within said casings operatively connected to said valve and dividing said casings into four chambers, said valve being arranged between the conduit and the first chamber; a conduit connecting the first chamber to the second chamber; a constriction in said conduit; said second chamber being connected to communicate with the third chamber; a gas discharge conduit also connected to said second chamber; and means for creating a controlling pressure in the fourth chamber which is proportional to the absolute temperature of the gas, the diaphragm which is operable by said controlling pressure being smaller than said other diaphragm, whereby the differential pressure across said constriction is maintained substantially inversely proportional to the density of the gas and the flow is measurable approximately in terms of standard temperature and pressure conditions.

14. Apparatus for controlling the flow of gas comprising, in combination, a conduit; a constriction therein; throttling means in said conduit independent of said constriction; means responsive to the differential pressure across the constriction connected to control said throttling means; and means responsive to the absolute temperature of the gas connected to modify the action of the differential pressure on said throttling means, whereby the absolute pressure of the gas is varied proportional to the absolute temperature of the gas and the weight flow of gas per time unit stands in a fixed relation to the area of said constriction.

15. The combination with a gas conduit and a constriction therein, of a flow regulating valve independent of said constriction; means responsive to the pressure drop across said constriction and connected to actuate said regulating valve; and means responsive to the absolute temperature of the gas connected to modify the action of the pressure drop on said regulating valve, whereby the absolute pressure of the gas is varied proportional to the absolute temperature of the gas and the weight flow of the gas per time unit may be maintained substantially constant.

PAUL RHEINLÄNDER.